(12) United States Patent
Roberts

(10) Patent No.: US 7,530,774 B2
(45) Date of Patent: May 12, 2009

(54) AIR CARGO ROLLOUT STOP

(75) Inventor: Aaron J. Roberts, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 11/777,636

(22) Filed: Jul. 13, 2007

(65) Prior Publication Data

US 2009/0016838 A1   Jan. 15, 2009

(51) Int. Cl.
*B60P 7/08* (2006.01)

(52) U.S. Cl. .......................... 410/94; 410/69

(58) Field of Classification Search ............ 410/94, 410/69, 77, 80; 244/118.1, 137.1; 248/351
See application file for complete search history.

(56) References Cited

U.S. PATENT DOCUMENTS

| | | | |
|---|---|---|---|
| 2,424,429 A * | 7/1947 | Bamberg | |
| 3,796,397 A | 3/1974 | Alberti | |
| 4,557,648 A | 12/1985 | Koch et al. | |
| 4,583,896 A * | 4/1986 | Vogg et al. | 410/69 |
| 5,004,387 A | 4/1991 | Jensen et al. | |
| 5,090,638 A * | 2/1992 | Eilenstein-Wiegmanns et al. | |
| 5,178,346 A | 1/1993 | Beroth | |
| 5,486,077 A | 1/1996 | Nutting | |
| 5,823,727 A | 10/1998 | Lee | |
| 6,413,029 B1 | 7/2002 | Kemkamp | |
| 6,557,800 B2 | 5/2003 | Medina et al. | |
| 6,896,456 B2 | 5/2005 | Huber | |

* cited by examiner

*Primary Examiner*—Stephen Gordon
(74) *Attorney, Agent, or Firm*—Womble Carlyle Sandridge & Rice, PLLC

(57) ABSTRACT

A cargo rollout stop includes a base, and a guide head pivotally mounted to the base. The guide head is movable between a raised blocking position, and a lowered non-blocking position. A retraction pedal is pivotally mounted to the guide head, and is movable between a first position and a second position relative to the guide head. The retraction pedal permits downward rotation of the guide head from its raised blocking position to its lowered non-blocking position when the retraction pedal is in its second position, and blocks downward rotation of the guide head from its raised blocking position to its lowered non-blocking position when the retraction pedal is in its it first position.

9 Claims, 8 Drawing Sheets

AIR CARGO ROLLOUT STOP

FIELD OF THE INVENTION

The invention relates to aircraft cargo loading and unloading systems, and more particularly, relates to a rollout stop for selectively preventing unwanted movement of a cargo container or pallet in an aircraft.

BACKGROUND

A principle design goal associated with cargo aircraft is minimizing the time required to load and unload cargo containers to and from an aircraft's cargo compartment. Aircraft cargo normally is pre-packaged in or on specially designed containers or pallets known as unit load devices (hereinafter "ULDs") that are sized and shaped to occupy substantially all available space within the cargo compartment of an aircraft. A modem aircraft's cargo compartment typically includes a cargo deck equipped with a plurality of ball mats positioned proximate to the aircraft's cargo door. The ball mats facilitate rolling movement of the ULDs through the door and into and out of the cargo compartment. Aircraft cargo decks also typically include roller trays that extend in fore and aft directions, and that facilitate rolling fore and aft movement of ULDs between the area proximate to the cargo door and various cargo stowage positions within the cargo compartment. In many modem cargo aircraft, ULDs can be loaded through the aircraft's nose section and through at least one side cargo door.

During loading and unloading operations, an aircraft's cargo deck may not be perfectly level, or can change from a level condition to a non-level condition as cargo is loaded or unloaded to and from the aircraft. In certain situations, an aircraft's cargo deck can slope in a direction that permits an unattended ULD to roll downhill toward the aircraft's open cargo door. In order to prevent an unattended ULD from rolling out of a cargo compartment through an open cargo door, cargo aircraft often include one or more blocking devices (hereinafter "rollout stops") that can be incrementally spaced along the sill of the cargo door. In operation, such rollout stop devices act like one-way gates that permit intended movement of a ULD through an open cargo door and into an aircraft's cargo hold, and also prevent unintended rolling movement of a ULD out of the aircraft's cargo door.

Various types of rollout stops are known for blocking unwanted outward rolling movement of ULDs. Generally, such devices include at least one retractable guide head that can be selectively raised to a height above the cargo deck that is sufficient to block outward rolling movement of a ULD through a cargo door. Typically, such retractable guide heads have a generally upwardly and inwardly sloping top surface that is contacted by the leading lower edge and bottom surface of a ULD as the ULD passes over the stop and into a cargo hold, thereby forcing the upright guide head to automatically retract as the ULD passes over the guide head and into the cargo hold. Typically, the retractable guide heads are upwardly biased by one or more springs that maintain the guide heads in a raised position until the guide heads are forced to retract by an inwardly moving ULD. Once an inwardly moving ULD passes over the rollout stop, the springs return the guide heads to their raised positions, thereby generally preventing the just-loaded ULD or another already-loaded ULD from rolling in a reverse direction through the open cargo door. Accordingly, such rollout stops can be described as being "over-ridable" in an inward direction, and as being generally "non-overridable" in an outward direction. In order to permit ULDs to be unloaded from a cargo compartment without obstruction, the retractable guide heads generally are configured to be selectively latched or otherwise restrained in a lowered, non-blocking position when not in use.

Though prior art rollout stops can be effective to prevent outward rolling movement of most ULDs, the lower edges of a ULD can become warped from use. In some cases, if a lower trailing edge of a ULD is sufficiently upwardly bent, the lower trailing edge can be at an elevation that is sufficiently high to at least partially extend over a raised guide head as the ULD approaches the rollout stop in an outward direction. Accordingly, the warped lower trailing edge and bottom surface of the ULD may force the guide downward as the ULD passes over the stop in an outward direction, thereby undesirably overriding the rollout stop in the outward direction.

Another problem with prior art rollout stops is that they are not designed to yield to excessive contact loads with an outbound ULD. In situations where an outbound ULD approaches a prior art rollout stop at a high velocity and/or is especially heavy, the outbound ULD can impact the rollout stop with sufficiently high force to at least partially damage the aircraft structure to which the rollout stop is mounted.

Accordingly, there is a need for a rollout stop apparatus that substantially reduces the possibility that an outbound ULD will override the rollout stop. Preferably, the rollout stop should be relatively simple in construction such that production and repair costs are minimized. In addition, such a roll out stop should be designed to yield to an outbound ULD that contacts the rollout stop with sufficient force to otherwise damage the support structure of an aircraft to which the rollout stop is mounted.

SUMMARY

In one embodiment, a cargo rollout stop includes a base, and a guide head pivotally mounted to the base. The guide head is movable between a raised blocking position, and a lowered non-blocking position. A retraction pedal is pivotally mounted to the guide head, and is movable between a first position and a second position relative to the guide head. The retraction pedal permits downward rotation of the guide head from its raised blocking position to its lowered non-blocking position when the retraction pedal is in its second position, and blocks downward rotation of the guide head from its raised blocking position to its lowered non-blocking position when the retraction pedal is in its it first position.

In one embodiment, a cargo rollout stop for an aircraft includes a means for stopping. The means for stopping is movable between a stopping position and an inactive position. The rollout stop further includes a means for supporting the means for stopping. The means for supporting is selectively movable between a support position and a retracted position. When the means for supporting is in its support position, the means for stopping is prevented from moving from its stopping position and its inactive position. When the means for supporting is in its retracted position, the means for stopping is free to move from its stopping position to its inactive position.

A method of selectively preventing a cargo container or pallet from rolling out of a cargo door of an aircraft includes providing at least one selectively retractable guide head proximate to a cargo deck and adjacent to the cargo door. The method further includes raising the guide head to a cargo stopping position, and blocking retraction of the guide head away from its cargo stopping position due to contact between the guide head and an outwardly moving cargo container. The method also includes permitting retraction of the guide head away from its cargo stopping position as the result of contact between the guide head and an inwardly moving cargo container.

An apparatus for selectively preventing retraction of a retractable guide head of a cargo rollout stop includes a retraction pedal that is pivotally mounted to the guide head. The pedal upwardly extends from a cam surface of the guide head when the retraction pedal is in a raised position. A blocking member downwardly depends from the retraction pedal when the retraction pedal is in its raised position, and blocks downward movement of the guide head when the retraction pedal is in the raised position.

These and other aspects of the invention will be apparent from a reading of the following detailed description together with the drawings.

DETAILED DESCRIPTION

One embodiment of a rollout stop according to the invention is shown in FIGS. 1-7. As shown in FIGS. 1-4, a rollout stop 110 can include a base 120, a guide head 130 movably mounted to the base 120, and a blocking member or retraction pedal 150 movably mounted to the guide head 130. The guide head 130 and the retraction pedal 150 are shown in their fully raised positions in FIGS. 1, 3, and 5, and are shown in their fully lowered or retracted positions in FIGS. 2, 4, and 6.

Figure 1:
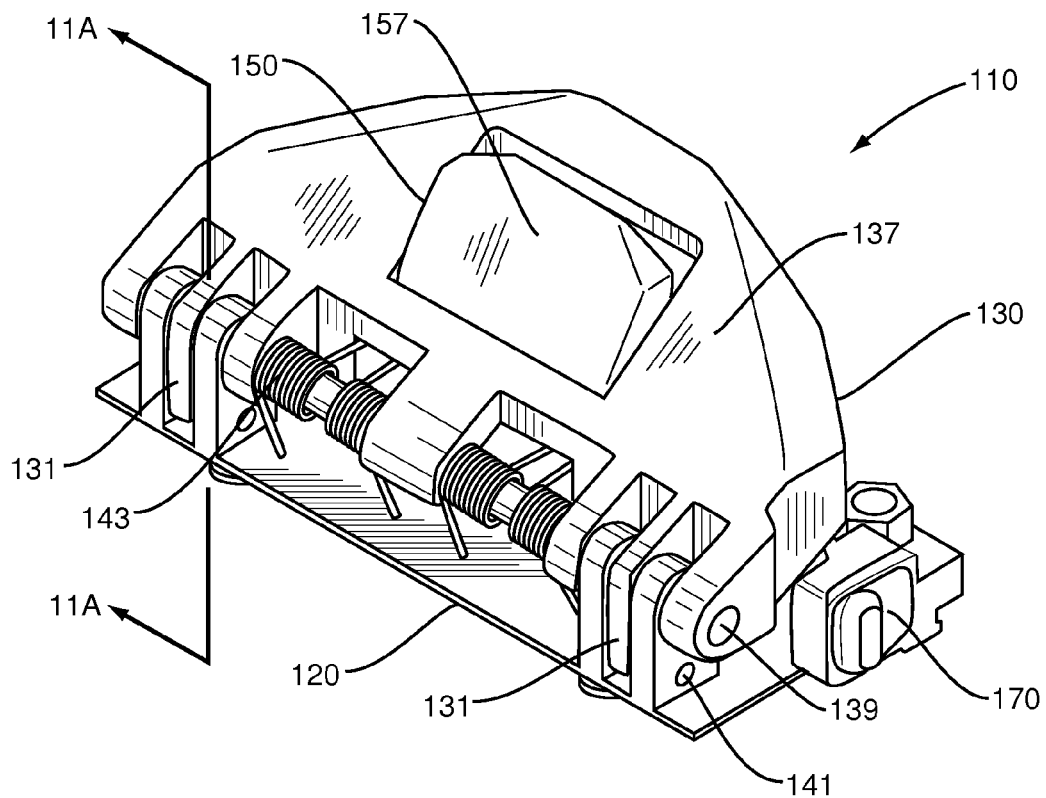
FIG. 1 is a top outboard perspective view of one embodiment of a rollout stop according to the invention in a raised, blocking position.
Figure 2:
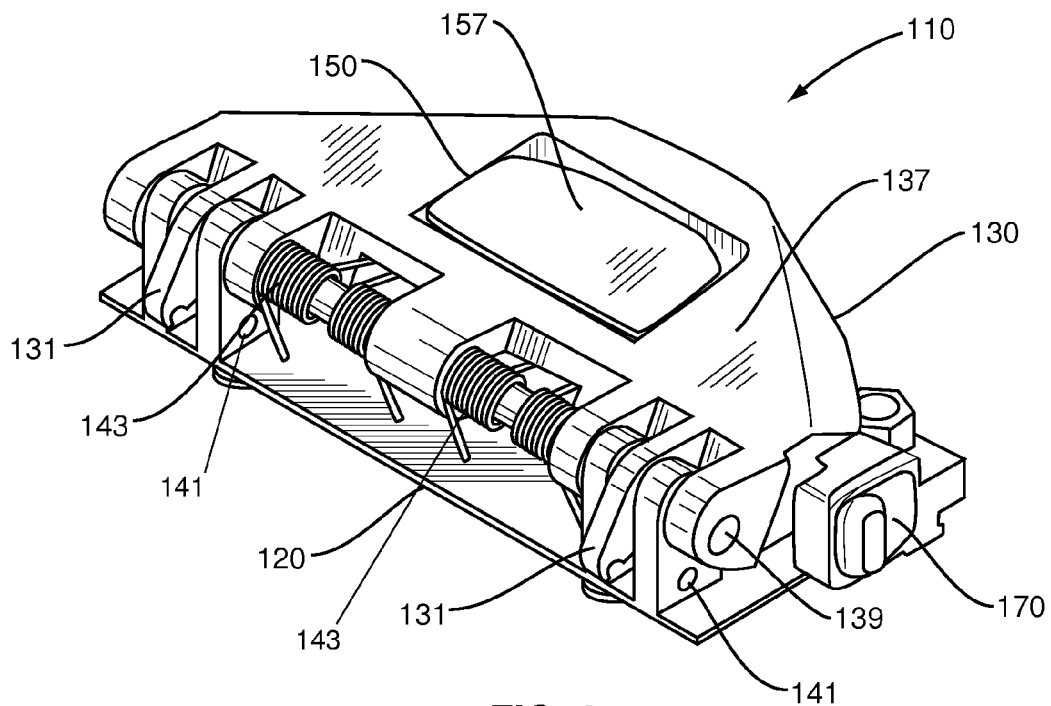
FIG. 2 is a top outboard perspective view of the rollout stop of FIG. 1 in a retracted, non-blocking position.
Figure 11A:
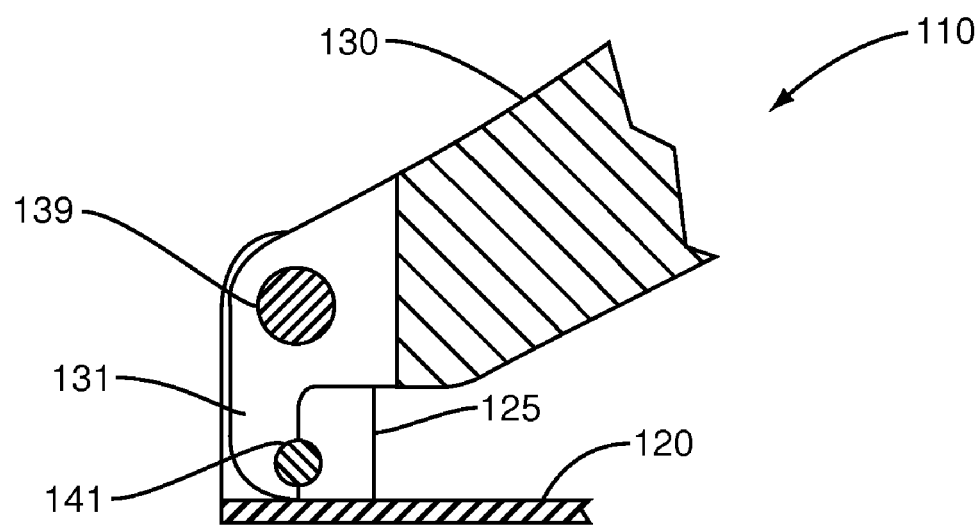
FIG. 11A is a cross sectional view of a portion of the rollout stop shown in FIGS. 1-7 taken along line 11A-11A in FIG. 1.

Referring to FIG. 1, the guide head 130 can be pivotally mounted to the base 120 by a hinge pin 139. As shown in FIGS. 1 and 2, springs 143 can be arranged to push the guide head 130 upward and away from the base 120 toward its raised position. As best seen in FIGS. 1, 2 and 11A, the upward rotational displacement of the guide head 130 can be limited by contact between a pair of arms 131 on the guide head 130, and a pair of shear pins 141 positioned below the hinge pin 139 on the base 120.

Figure 3:
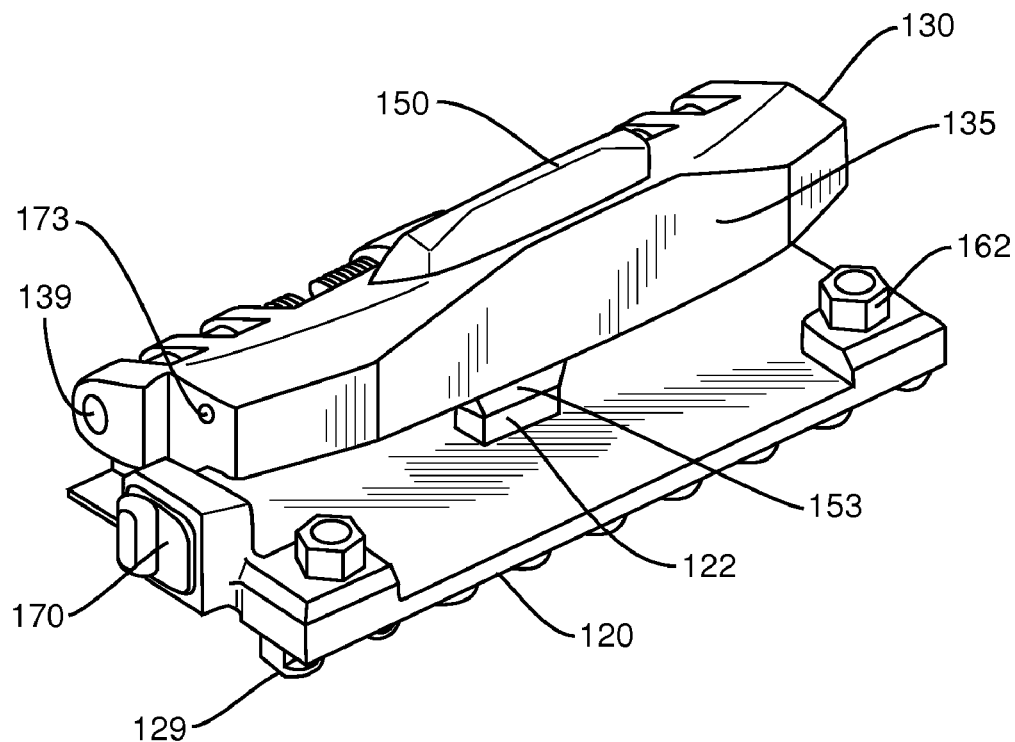
FIG. 3 is a top inboard view of the rollout stop of FIGS. 1 and 2 in a raised, blocking position.
Figure 4:
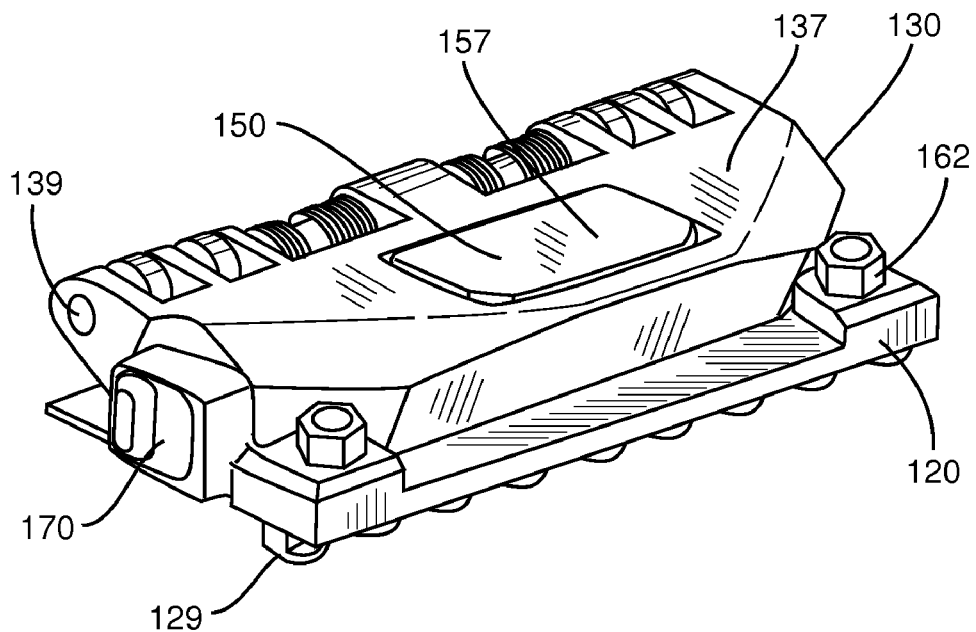
FIG. 4 is a top inboard view of the rollout stop of FIGS. 1-3 in a retracted, non-blocking position.
Figure 5:
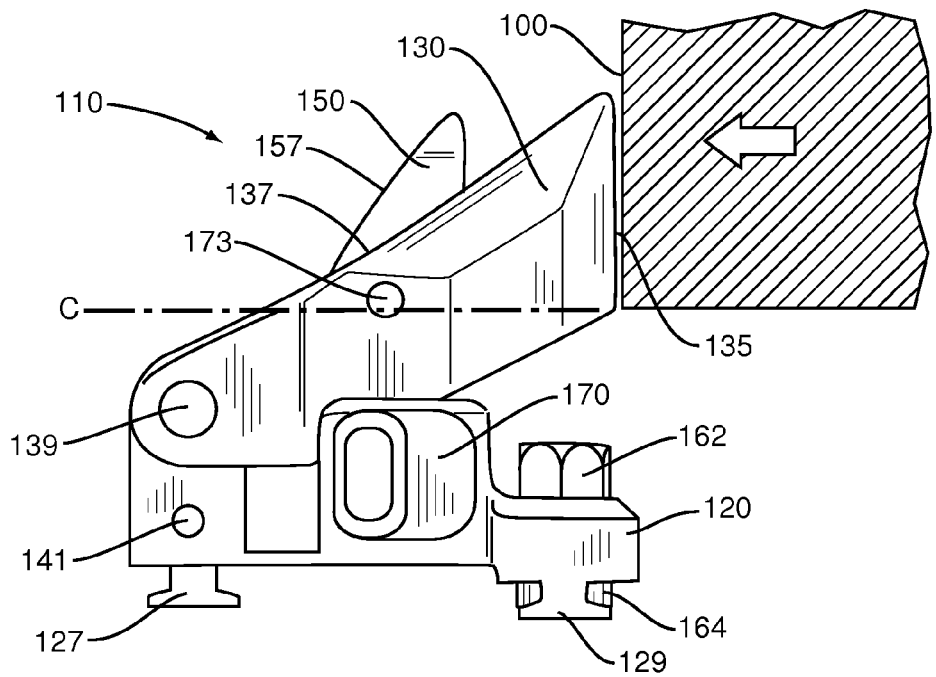
FIG. 5 is a side elevation view of the rollout stop of FIGS. 1-4 in a raised, blocking position.

As shown in FIGS. 3-5, the guide head 130 can include a substantially planar blocking surface 135 and an upper cam surface 137. The blocking surface 135 can be substantially vertical when the guide head 130 is in its raised position. The upper cam surface 137 of the guide head 130 can have various profiles, including being substantially planar or having a concave curvature. In the embodiment shown in FIGS. 5 and 6, the upper cam surface 137 has a slightly concave curvature.

Figure 6:
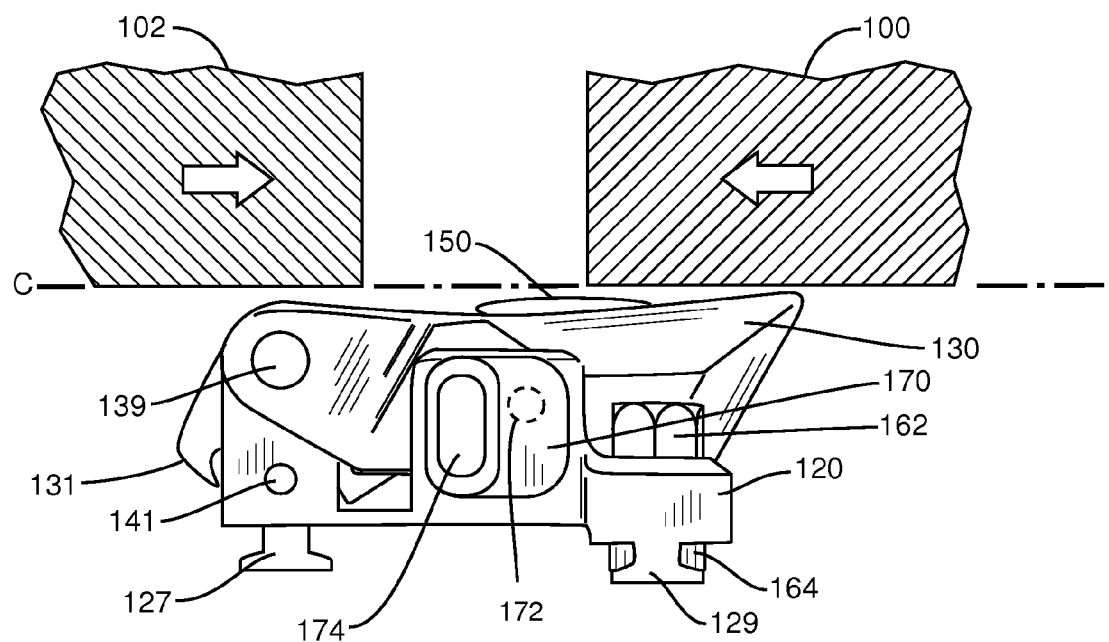
FIG. 6 is a side elevation view of the rollout stop of FIGS. 1-5 in a retracted, non-blocking position.
Figure 9:
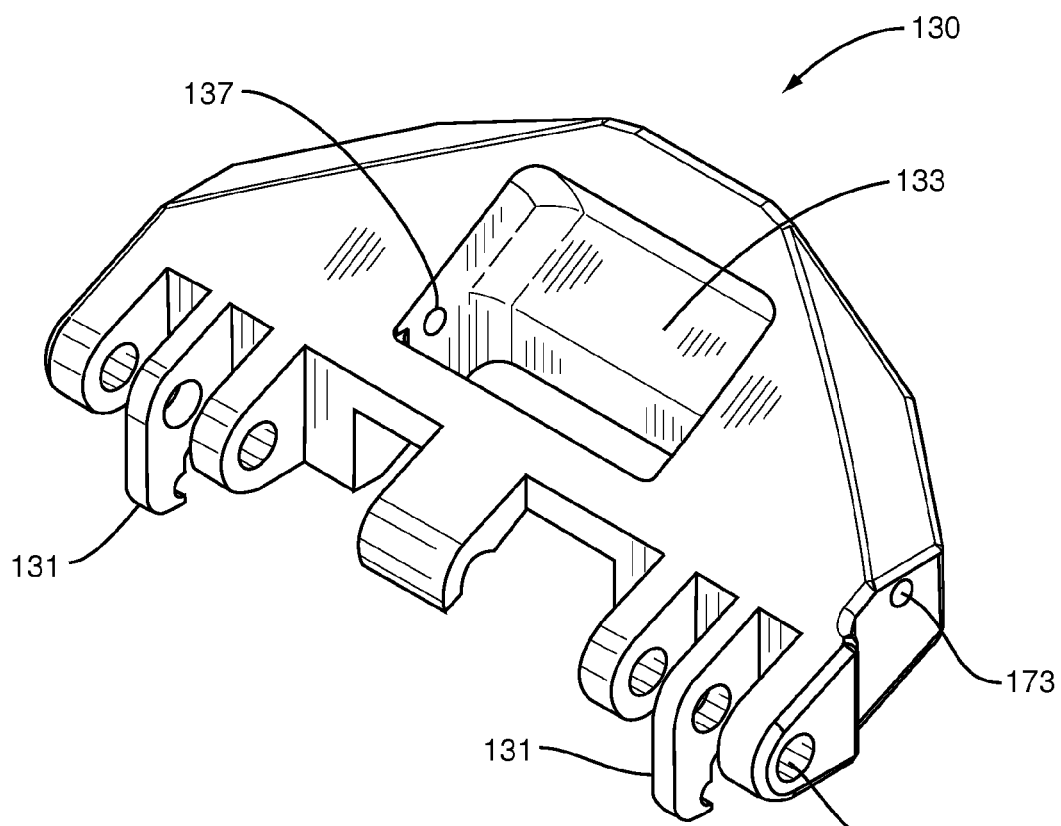
FIG. 9 is a top outboard view of a guide head portion of the rollout stop shown in FIGS. 1-7.
Figure 10:
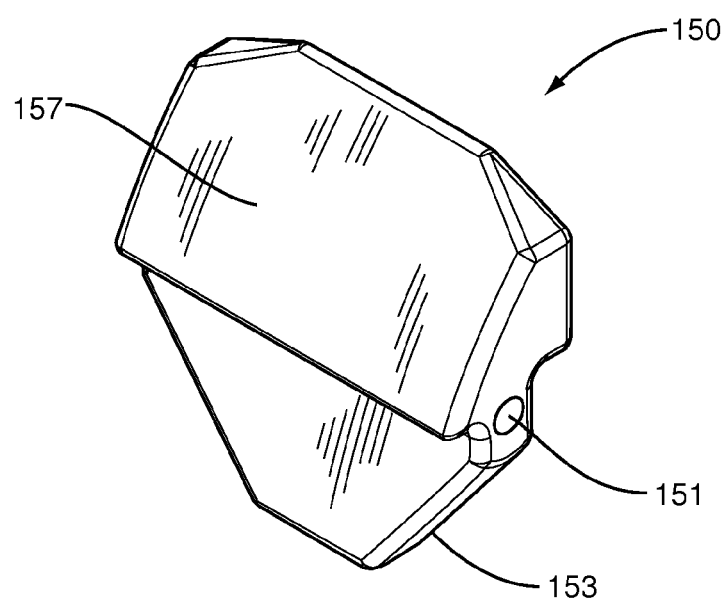
FIG. 10 is a top outboard view of a guide head portion of the rollout stop shown in FIGS. 1-7.
Figure 13:
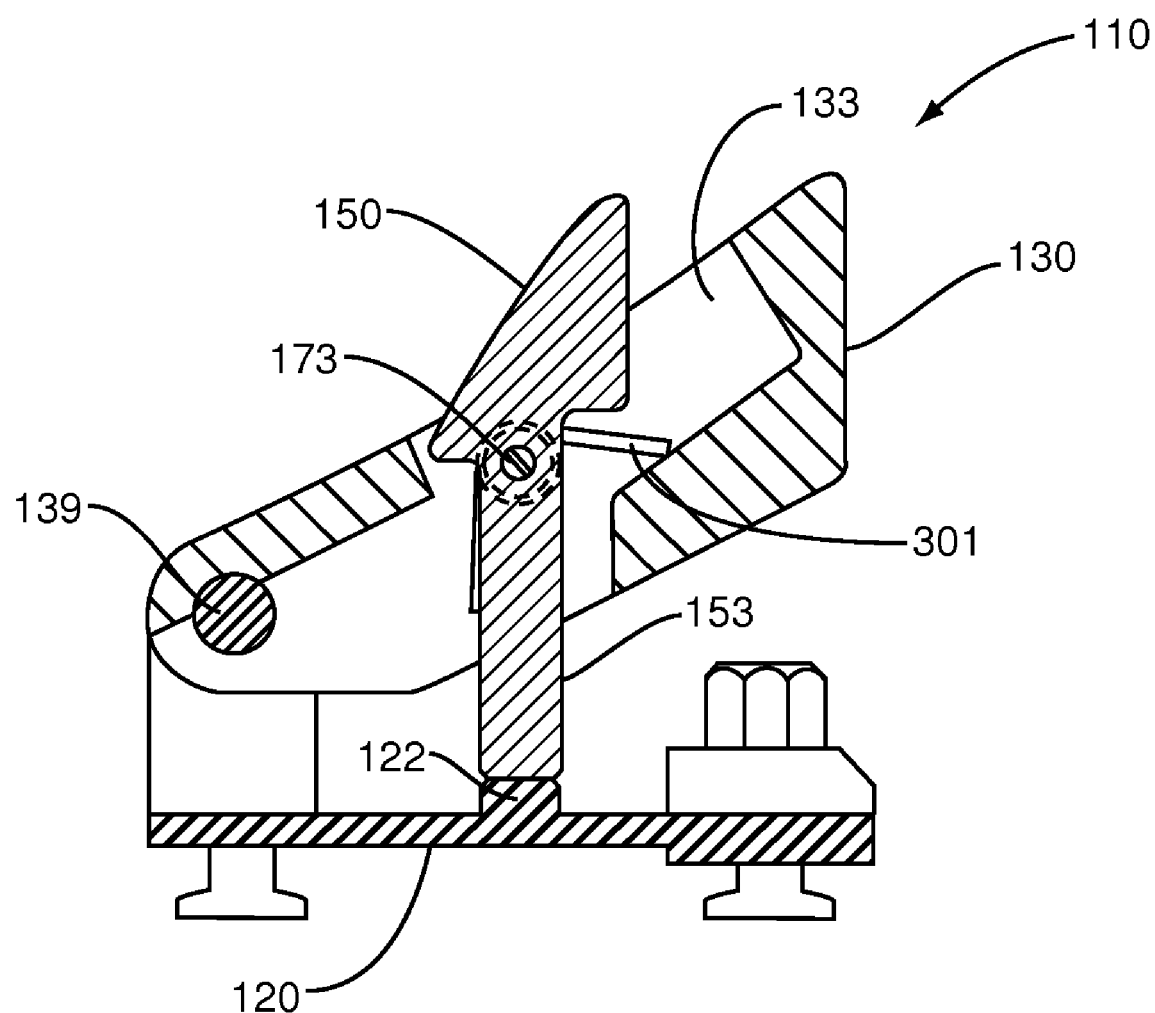
FIG. 13 is a cross-sectional elevation view of the rollout stop shown in FIGS. 1-7 showing the pedal and guide head in there raised positions.

As shown in FIGS. 1-6, the retraction pedal 150 can be pivotally mounted to the guide head 130 such that the pedal 150 can rotate between a raised position (shown in FIGS. 1, 3 and 5), and a retracted position (shown in FIGS. 2, 4 and 6). The retraction pedal 150 is received in a pedal opening 133 in the guide head 130 which is shown in FIG. 9. The pedal opening 133 is configured to permit rotating movement of the pedal 150 in the opening 133, and to permit portions of the pedal 150 to upwardly and downwardly extend from the opening. As shown in FIG. 5, the retraction pedal 150 can be pivotally mounted to the guide head 130 by a pivot pin 173 engaged in a pivot opening 151 in the retraction pedal 150 (as shown in FIG. 10), and aligned openings 137 in the guide head 130 (as shown in FIG. 9). As shown in FIG. 13, one or more springs 301 can be provided between the guide head 130 and pedal 150 to resiliently bias the retraction pedal 150 toward its raised position. As shown in FIGS. 1, 2, 4, 5 and 10, the retraction pedal 150 can include an upper pedal surface 157. As best seen in FIGS. S and 10, the upper pedal surface 157 can have a slightly convex curvature. The convex curvature facilitates downward movement of the pedal 150 as a leading lower edge of an inbound ULD contacts and traverses the upper pedal surface 157. Alternatively, the upper pedal surface 157 can be substantially flat.

As shown in FIG. 10, the retraction pedal 150 can include a blocking portion 153 that downwardly extends from the retraction pedal 150 when the pedal 150 is in its raised position. As shown in FIGS. 3 and 13, the downwardly depending blocking portion 153 of the pedal 150 contacts the base 120 when the pedal 150 is in its raised position. As also shown in FIGS. 3 and 13, the base 120 can include a support block 122 that underlies and vertically supports the blocking portion 153 of the pedal 150 when the pedal 150 and guide head 130 are in their raised positions. Accordingly, contact between the blocking portion 153 of the pedal 150 and the base 120 blocks downward movement of the pedal 150 and the connected guide head 130 from their raised positions.

Figure 7:
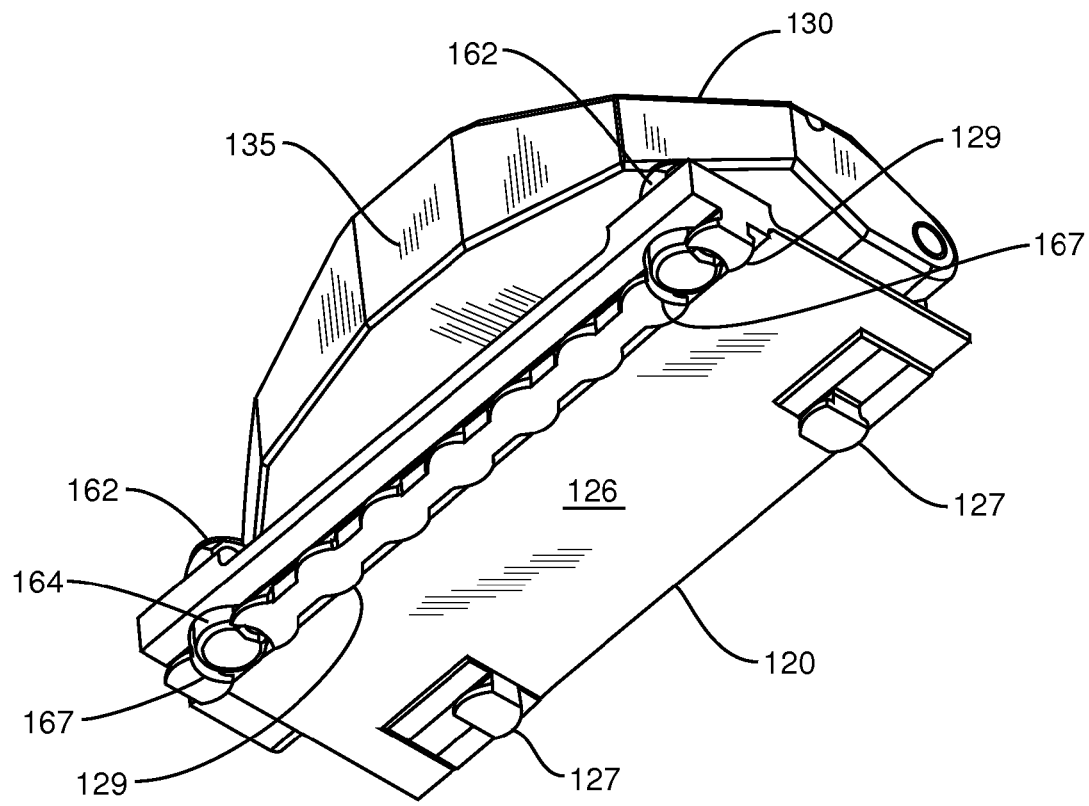
FIG. 7 is a bottom inboard perspective view of the rollout stop of FIGS. 1-6.
Figure 8:
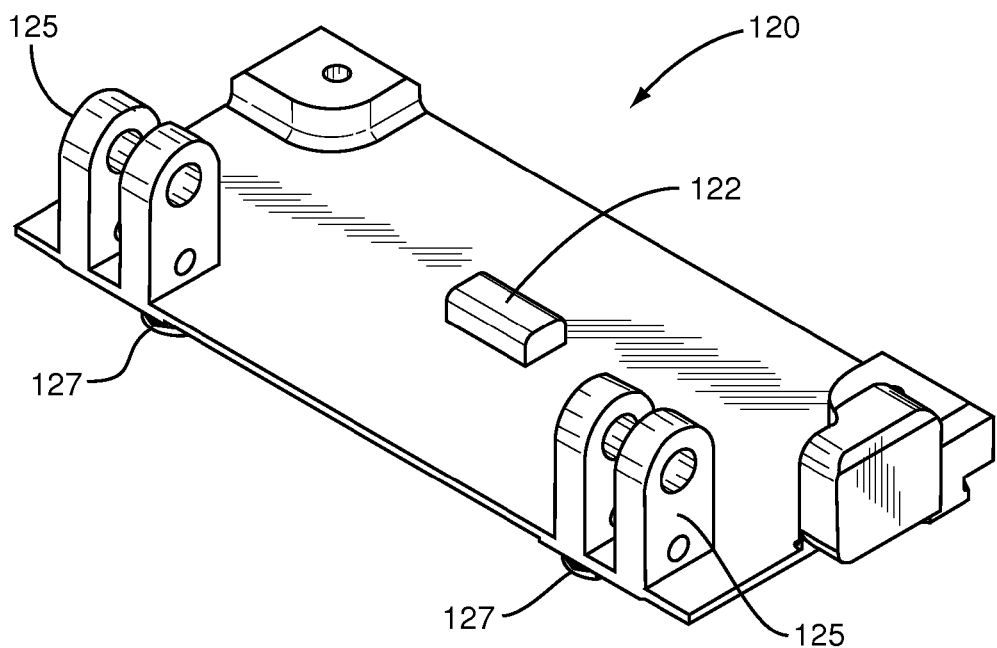
FIG. 8 is a top outboard perspective view of a base portion of the rollout stop shown in FIGS. 1-7.

As shown in FIG. 7, the bottom of the base 120 can include a substantially planar lower surface 126, a pair of downwardly depending feet 127, and an elongated series of spaced lobes 129. The feet 127 and spaced lobes 129 can be of a type known in the art for mounting items to conventional seat tracks in an aircraft. The feet 127 and lobes 129 can be substantially circular in shape, and configured to be inserted through the spaced circular openings of a pair of conventional parallel aircraft seat tracks (not shown in the drawings). Once so inserted, the feet 127 and lobes 129 are configured to longitudinally slide in the bell-shaped grooves of the conventional seat tracks until the base 120 is in a desired installed position, and the feet 127 and lobes 129 are aligned beneath vertical restraining tabs of the seat tracks. As shown in FIG. 7, the base 120 can further include a pair of anchor openings 164 that align with anchor bolts 62 and anchor buttons 164 of types known in the art that are configured to anchor the base 120 to conventional seat tracks along the sill of an aircraft cargo door.

The upper cam surface 137 of the guide head 150 and the upper pedal surface 157 of the retraction pedal 150 can be configured such that as the lower leading edge of an inbound ULD reaches the rollout stop 110 and begins to pass over the stop 110, contact between the lower leading edge of the ULD and the pedal surface 157 and upper cam surface 137 downwardly rotates the retraction pedal 150 such that blocking contact between the blocking portion 153 and the base 120 (as shown in FIG. 13) is disrupted. Accordingly, as the inbound ULD continues to pass over the guide head 130, the guide head 130 and retraction pedal 150 downwardly deflect beneath the lower leading edge of the ULD. Accordingly, an inbound ULD automatically overrides the rollout stop 110, and is free to pass over the stop 110 without substantial obstruction during cargo loading.

Figure 12:
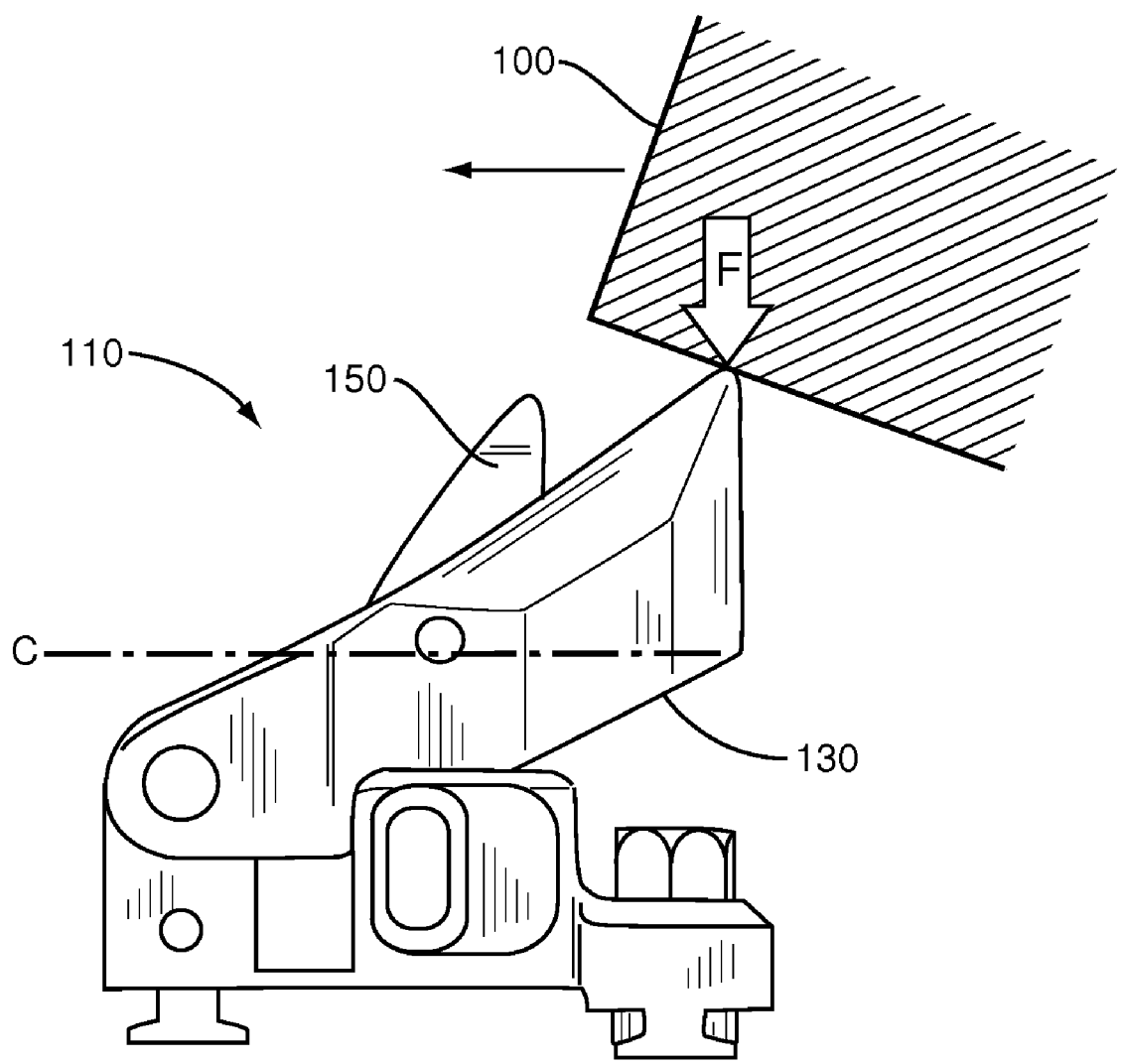
FIG. 12 is a side elevation view of the rollout stop shown in FIGS. 1-7 with the guide head being contacted by an upwardly deformed leading edge an outbound ULD.

Once the inbound ULD completely passes over the stop 110, the springs 143 automatically return the retraction pedal guide head 130 to its raised position. As shown in FIG. 5, when the guide head 130 is in its raised position, a substantial portion of the guide head 130 extends above the cargo roller plane "C" on which the bottoms of the ULDs travel. Accordingly, the substantially vertical blocking surface 135 of the raised guide head 130 blocks passage of an outbound ULD 100 that may inadvertently move in an outbound direction as indicated by the arrow in FIG. 5. In addition, the downwardly depending blocking portion 153 of the raised pedal 150 (as shown in FIG. 13) effectively blocks downward movement of the guide head 130 that might otherwise be caused by a downward force F (as shown in FIG. 12) that might result from contact between the top edge of the guide head 130 and an upwardly deformed or otherwise upwardly positioned lower edge of an outbound ULD 100. Accordingly, though an inbound ULD can override the upright rollout stop 110 when traveling in an inbound or loading direction as described above, the stop 110 effectively prevents an outbound ULD 100 from inadvertently overriding the rollout stop 110 when moving in the outbound or exit direction.

As shown in FIG. 6, during unloading operations, it is necessary to retract the guide head 130 from its raised position in order to permit an outbound ULD 100 to pass over the rollout stop 110 without obstruction as the ULD 100 exits the cargo hold. The retracted guide head 130 also permits an inbound ULD 102 to pass over the rollout stop 110 without obstruction as the ULD 102 enters the cargo hold. In order to restrain the guide head 130 in the retracted position shown in FIG. 6, the rollout stop 110 includes a latching mechanism 170 that selectively engages and restrains the retraction guide head 130 when the guide head 130 is rotated to its lowermost, retracted position. As shown in FIG. 6, the latch mechanism 170 can include a button 174 engaged with a spring-loaded latch pin 172 (shown by a dashed circle in FIG. 6). To retract the erected rollout stop 110 shown in FIGS. 1, 3, and 5, a cargo crew person can step on and depress the pedal surface 157 of the retraction pedal 150 to force the pedal 150 and the interconnected guide head 130 down to their lowered positions. As a result, the pedal 150 is forced to rotate downwardly about pivot pin 173, and the guide head 130 is forced to rotate downwardly about its hinge pin 139. Once the retraction guide head 130 is fully lowered as shown in FIG. 6, the latch pin 172 snaps into restraining engagement with the guide head 130, thereby preventing the wound springs 143 (shown in FIGS. 1 and 2) from pushing the guide head 130 back to an erect position. In order to raise the retracted and latched guide head 130 to its raised, blocking position, a crew person can depress the latch button 174, thereby disengaging the latch pin 172 from the guide head 130, and permitting the springs 143 to automatically return the guide head 130 to its erect, cargo-blocking position (shown in FIGS. 1, 3 and 5). The latch pin 172 can be actuated by any type of latching mechanism 170 that permits selective, manually-actuated displacement of the latch pin 172 between engagement and disengagement with the guide head 130.

Figure 11B:
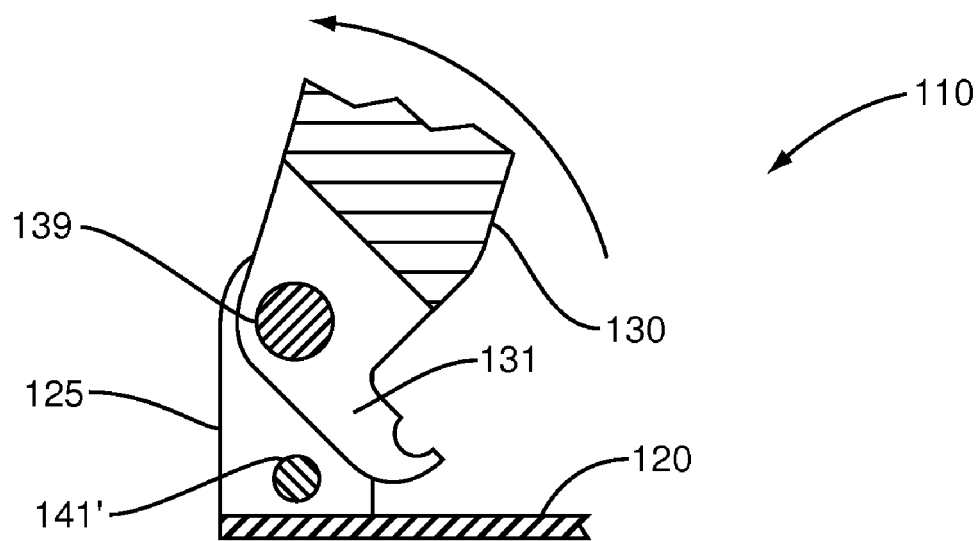
FIG. 11B is a cross sectional view of the portion of the rollout stop shown in FIG. 11A with the shear pin sheared and the guide head rotated upward beyond its normal erect position.

As shown in FIGS. 11A and 11B, one embodiment of a rollout stop according to the invention can include one or more shear pins 141. In the embodiment shown in FIGS. 11A and 11B, a shear pin 141 is supported on a pivot support 125 on the base 120, or is disposed between a pair of adjacent pivot supports 125 on the base. As shown in FIG. 11A, when the guide head 130 is in its normal upright stopping position, the shear pin 141 blocks further upward rotation of the guide head 130 due to contact between the shear pin 141 and the arm 131 on the guide head 130. The shear pin 141 can be designed such that the pin 141 has sufficient shear strength to block further rotation of the guide head 130 and arm 131 under normal ULD contact loads. The shear pin 141 also is designed such that the pin 141 will be sheared by the guide head arm 131 when the loads exceed a predetermined maximum safe load condition, thereby permitting outward rotation the guide head 130 as shown in FIG. 11B. The guide head 130 can be configured such that once the shear pins 141 have been sheared away by the guide head arms 131, the guide head is free to rotate about 180 degrees from its retracted position. In a preferred embodiment, the shear pins 141 can be designed to shear when a maximum load of about 10,000 pounds is applied to the blocking surface 135 of the guide head 130 in an outbound direction. As shown in FIGS. 1 and 2, the rollout stop 110 can include two shear pins 141, and two or more corresponding guide head arms 131. In other embodiments, the rollout stop 110 can include multiple shear pins and/or guide head arms at each end of the rollout stop.

Thus, the rollout stop 110 described above provides an apparatus having a relatively simple construction that can substantially reduce the possibility that an outbound ULD 100 might override the rollout stop 110. The rollout stop 110 described above also is designed to yield to excessive ULD impact loads in order to minimize the possibility of damage to an aircraft structure.

The above description of various embodiments of the invention are intended to illustrate various benefits, features and aspects of the invention. Persons of ordinary skill in the art will recognize that certain changes and modifications can be made to the described embodiments without departing from the invention. For example, though the guide head and retraction pedal are shown and described as being pivotally mounted to a base, the pedal and/or guide head can be otherwise movably mounted to a base in any manner that facilitates upward and downward movement. For example, the retraction pedal and/or guide head can be attached to the base by a linkage system, such as a four-bar linkage system. All such changes and modifications are intended to be within the scope of the appended claims.

What is claimed is:

1. A cargo rollout stop comprising:
    (a) a base;
    (b) a guide head movably mounted to the base, the guide head being movable between a raised blocking position and a lowered non-blocking position;
    (c) a blocking member movably mounted to the guide head, the blocking member being movable between a first position and a second position relative to the guide head; and (d) at least one shear pin that is positioned to block upward movement of the guide head beyond its raised blocking position under a first operating load, and is configured to permit upward movement of the guide head beyond its raised blocking position under a second operating load that is higher than the first operating load;

(e) wherein the blocking member permits downward rotation of the guide head from its raised blocking position to its lowered non-blocking position when the blocking member is in its second position, and blocks downward rotation of the guide head from its raised blocking position to its lowered non-blocking position when the blocking member is in its it first position.

2. A cargo rollout stop according to claim 1, wherein the blocking member includes a pedal portion that is operative to selectively move the blocking member from its first position to its second position.

3. A cargo rollout stop according to claim 1, wherein the guide head includes an upper cam surface, the cam surface being configured to engage a leading edge of an inbound cargo unit such that the guide head is moved from its raised blocking position to its lowered non-blocking position by inbound movement of the leading edge.

4. A cargo rollout stop according to claim 2, wherein the pedal portion includes an upper surface configured to engage a leading edge of an inbound cargo unit such that the blocking member is moved from its first position to its second position by inbound movement of the leading edge.

5. A cargo rollout stop according to claim 1, further comprising at least one spring that is operable to bias the guide head toward its raised blocking position.

6. A cargo rollout stop according to claim 1, further comprising at least one spring configured to urge the blocking member toward its first position relative to the guide head.

7. A cargo rollout stop according to claim 1, further comprising a latch mechanism operable to restrain the guide head in a retracted position.

8. A cargo rollout stop according to claim 1, further comprising at least one mounting member configured for connection to a seat track of an aircraft.

9. A cargo rollout stop according to claim 1 wherein the guide head is pivotally mounted to the base.

* * * * *